United States Patent

Shimizu

[15] 3,702,550
[45] Nov. 14, 1972

[54] STEERING LOCK DEVICE
[72] Inventor: Yasushi Shimizu, Ohmiya, Japan
[73] Assignees: Nissan Motor Company, Limited, Yokohama City; Kanto Seiki Company, Limited, Ohmiya City, Japan
[22] Filed: May 5, 1971
[21] Appl. No.: 140,469

[30] Foreign Application Priority Data
May 12, 1970 Japan ..................... 45/40396

[52] U.S. Cl. .................. 70/252, 70/372, 70/389, 200/44
[51] Int. Cl. .................. B60r 25/02, E05b 11/00
[58] Field of Search ........... 70/252, 372, 389; 200/44

[56] References Cited

UNITED STATES PATENTS 1,762,921  6/1930  Fairchild ..................... 70/252
1,835,725  12/1931  Thompson et al. .......... 70/372
2,894,082  7/1959  Collotta ...................... 200/44

FOREIGN PATENTS OR APPLICATIONS 1,521,575  3/1968  France ....................... 70/252

Primary Examiner—Albert G. Craig, Jr.
Attorney—John Lezdey

[57] ABSTRACT

A combination ignition control and steering lock device for motor vehicles adapted to lock a steering column in two mutually independent steps. To lock the steering column, an ignition key is first rotated to the lock position and then a retaining means which has been in engagement with the key is rotated to a position in which the key can be disengaged therefrom and withdrawn from key cylinder. An accidental or erroneous locking of the steering column during operation of the motor vehicle is avoided in this manner.

8 Claims, 8 Drawing Figures

PATENTED NOV 14 1972
3,702,550
SHEET 1 OF 2
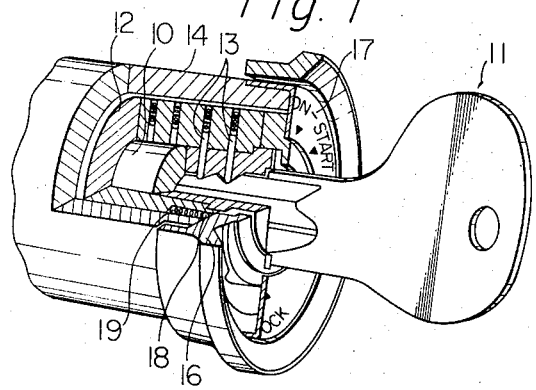
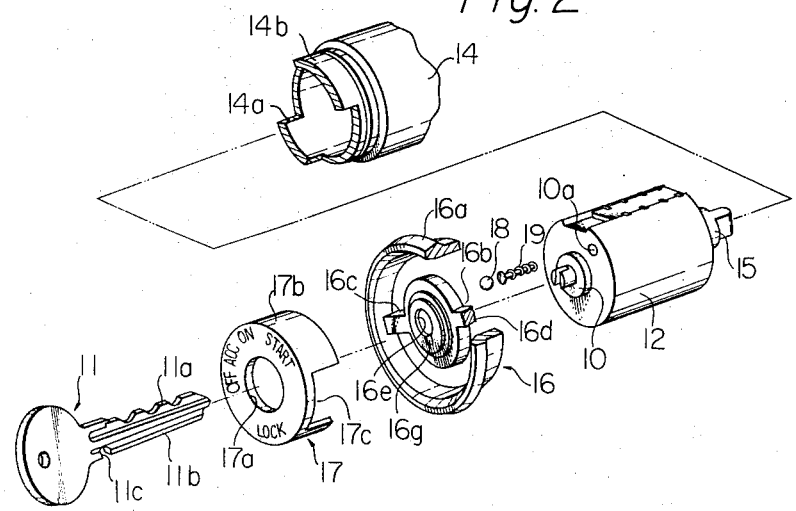
INVENTOR
YASUSHI SHIMIZU
BY
John Lezolley
ATTORNEY

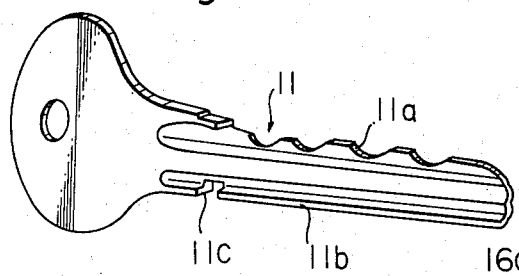
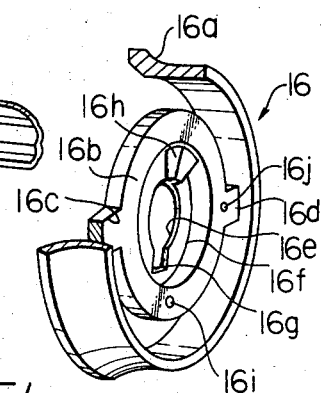
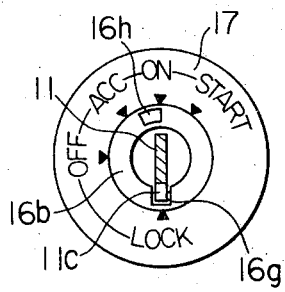
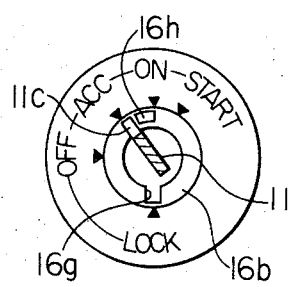
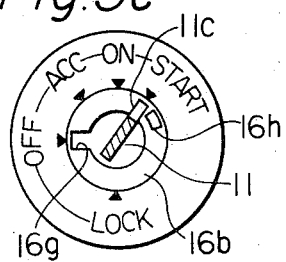
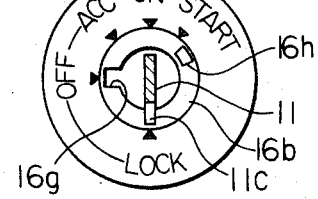

3,702,550

STEERING LOCK DEVICE

This invention relates to a combination ignition control and steering lock device for use in motor vehicles. The device to which this invention appertains is constructed to control an ignition switch for an engine and to lock a steering column when an ignition key is withdrawn from a key cylinder. In spite of such dual functions, the device is herein called merely the steering lock device for simplicity sake.

Prior art steering lock devices are constructed in such a manner that the lock device is conditioned to lock the steering column only after the ignition key has been withdrawn from the key cylinder so as to prevent the steering column from being locked even when the key is rotated to the lock position accidentally or erroneously by a vehicle driver or occupant during cruising. It, however, happens that the vehicle driver removes the key from the key cylinder before he knows as in rotating the key for coasting operation, thereby effecting undue locking of the steering column and consequently inviting a serious danger. This accident is traced to the fact that the key can be withdrawn by a relatively simple manipulation if the engine is shut down.

It is, therefore, an object of this invention to provide an improved steering lock device which provides reliability in the locking of the steering column for theft-preventive purposes.

Another object is to provide an improved steering lock device which is adapted to prevent the steering column from unduly locked during cruising of the motor vehicle.

Still another object is to provide an improved steering lock device in which the ignition key can not be withdrawn if the engine is shut down and the key is rotated to the lock position.

In order to achieve these objects of this invention, the steering lock device herein disclosed has a retaining means which is rotatable relative to the key cylinder. The retaining means is rotated together with the ignition key when the key is rotated to rotate the key cylinder to an operating position in which the ignition is turned on or in which a starting motor for the engine is energized. When the key is rotated counter in a reverse direction from such position, the retaining means is left in situ, preventing the key from being released therefrom. To have the ignition key withdrawn from the key cylinder, it is required to firstly rotate the key to the lock position and to secondly rotate the retaining means to a position in which the key can be released therefrom. Undue locking of the steering column can be prevented in these two consecutive steps which are not related to each other.

Accompanying drawings illustrate a preferred embodiment of this invention in which:

FIG. 1 is a fragmentary cut-away view showing an example of an internal construction of the steering lock device according to this invention;

FIG. 2 is an exploded partially cut-away view showing operational parts of the lock device of FIG. 1;

FIG. 3 is a perspective partially cut-away view showing a retaining member forming part of the lock device shown in the preceding figures;

FIG. 4 is also a perspective view of an example of an ignition key for use in the shown lock device; and FIGS. 5a to 5d are front end views of the lock device in different operational conditions.

Referring concurrently to FIGS. 1 to 4, the steering lock device implementing this invention includes, as customary, a rotatable key cylinder 10 which is rotated by an ignition key 11 inserted thereinto. The key cylinder 10 is rotatable accommodated in a generally cylindrical housing 12. A plurality of tumbler elements 13 having different lengths extend through the housing 12 and the key cylinder 10 for operative engagement with a notched edge 11a of the ignition key 11 in a given angular position. The housing 12 is encased securely in a frame structure 14. The key cylinder 10 extends throughout the housing 12 and is operatively connected at its leading end to an ignition switch (not shown) through a spindle 15 shown in FIG. 2. This construction of the shown lock device per se is well known in the art and may be changed and modified in numerous manners.

The lock device according to this invention further includes a retaining means 16 which is rotatably mounted on the front end portion of the frame structure 14. As best seen in FIG. 3, this retaining means 16 is largely made up of an outer annular member 16a and an inner disc member 16b which is positioned to be substantially concentrial with the outer annular member. The annular member 16a and the disc member 16b are securely connected to each other by a suitable number of connecting members which are herein shown as two by reference numerals 16c and 16d. The annular member 16a is circumferentially slidably mounted on the frame structure 14, as best seen in FIG. 1.

The disc member 16b has formed substantially centrally thereof an opening 16e which is configurated in a manner to admit passage of the key cylinder 10 and the ignition key 11 inserted thereinto. The disc member 16b, moreover, has on its rear side an annular sunk portion 16f surrounding the opening 16e. A recess 16g is formed radially in this annular sunk portion 16f, forming part of the opening 16e. This recess 16g is configurated in a manner to circumferentially slidably receive a top edge 11b of the ignition key 11. The ignition key 11 is thus passed through the opening 16e and the recess 16g when inserted into the key cylinder 10. To admit rotation of the ignition key 11 relative to the retaining means 16, an engaging portion which is herein shown as a recess 11c is formed at the top edge 11b of the key, forced to be slidably engageable with peripheral edge of the annular sunk portion 16f when the key 11 is rotated together with the key cylinder 10 in the housing 12. The disc member 16b further includes a land 16h which is mounted radially on the annular sunk portion 16f and located relative to the recess 16g. This land 16h engages with the top edge 11b of the ignition key 11 when the ignition key is rotated relatively thereto so that the retaining means 16 is rotated with the key.

The lock device is capped at its front end by a cap member 17 so as to provide visual indication of the lock device. This cap member 17 has formed in its front end wall an opening 17a for admitting insertion and rotation of the ignition key 11 therethrough and further has a rearwardly extending peripheral wall 17b having formed therein circumferential recesses one of which is designated by reference numeral 17c. The cap member 17 thus constructed is securely mounted on a front end portion of the frame structure 15 through an annular opening defined between the outer annular member 16a and the inner disc member 16b of the retaining means 16. The cap member 17 has its peripheral wall 17b permitted to clear over the connecting members 16c and 16d through the circumferential recesses such as denoted by 17c. The retaining means 16 is thus permitted to rotate relative to the cap member 17 when the key 11 is rotated to engage with the land 16h of the disc member 16b.

If desired, a steel ball 18 loaded by a compression spring 19 may be mounted between the front end face of the housing 12 and the rear end face of the disc member 16b thereby to provide a click feeling of control over the rotation of the retaining means 16. For this purpose, a hole 10a may be formed in the front end wall of the housing 12 to receive the spring 19 therein (FIG. 2) and substantially rounded depressions 16i and 16j may be formed in the rear end wall of the disc member 16b to receive the ball 18 therein (FIG. 3). The spring loaded steel ball 18 may be mounted in any desired number, although only one steel ball is herein shown as used.

The frame structure 14 is provided with front extensions 14a and 14b which extend from the front end of the frame structure and which are positioned at a predetermined angular spacing from each other for engagement with the connecting members 16b and 16c, as will be discussed later.

In addition to the above mentioned parts and elements, the steering lock member includes a locking means which is adapted to be in locking engagement with the steering column when the key is rotated to the lock position and withdrawn from the key cylinder. Since the construction and operation of such locking means are well known in the art and since this invention could be understood without resort to clarifying such locking means, discussion thereabout is herein omitted.

As seen in FIGS. 5a to 5d, the steering lock device has five different position, a LOCK position to lock the steering column, an OFF position to turn off the ignition, an ACC position to energize accessory appliances (such as a radio, air conditioner etc.), an ON position to turn on the ignition, and a START position to energize the starting motor. These positions can be selected by turning the key 11 relative to the cap member 17.

The angular spacing between the recess 16g and the land 16h of the retaining means 16 is determined in a manner to permit the ignition key 11 to rotate between the LOCK and ACC positions independently of the retaining means 16. In other words, rotation of the key 11 together with the key cylinder 10 is not followed by rotation of the retaining means as long as the key is rotated between the LOCK and ACC positions through the OFF position. The clockwise rotation of the retaining means 16 through engagement between the land 16h and the top edge 11b is limited by engagement between the connecting member 16c and 16d and the front extensions 14a and 14b. Thus, the retaining means 16 is permitted to rotate between the ACC and START positions through the ON position.

When, in operation, the retaining means 16 is first manually rotated relatively to the cap member 17 so that the recess 16b in the disc member 16b is moved to the LOCK position as illustrated in FIG. 5a. The ignition key 11 is then inserted into the key cylinder 10 and rotated together with the key cylinder until the key is brought into engagement with the land 16h of the retaining member 16 in the ACC position, as seen in FIG. 5b. When the ignition key 11 is further rotated clockwise from the ACC position, the retaining means 16 is rotated accordingly through engagement between the land 16h of the retaining means and the ignition key. When the key 11 and accordingly the key cylinder 10 are moved to the ON position, then the ignition switch connected to the key cylinder through the spindle 15 (FIG. 2) is actuated to energize an ignition coil (not shown) connected thereto. When the key 11 is still further rotated to the START position with the recess 16g aligned with the marking of the OFF position on the cap member 17, as shown in FIG. 5c, the retaining means 16 is also moved to its clockwise limit position with its connecting members 16c and 16d held in engagement with the side edges of the spaced front extensions 14a and 14b. At the same time, the ignition switch is moved and connected to a contact (not shown) for energizing a starting motor for the engine. The steel ball 18 which is biased toward the retaining means 16 by the associated spring 19 is now captured in the rounded depression 16i in the disc member 16b of the retaining means so that the retaining member is securely positioned.

If, in this condition, the key 11 which is biased counter clockwise by a spring action is moved back to the ON position, the retaining means 16 is left in situ because the land 16h is now released from the key 11. If the key 11 is rotated counter clockwise to the LOCK position, the retaining means 16 still remains in the START position as seen in FIG. 5d. The recess 16g is thus still held in alignment with the marking of the OFF position, the key 11 is prevented from being withdrawn from the key cylinder 10 due to engagement between the recess 11c in the key and the annular sunk portion 16f of the disc member 16b of the retaining means 16. The key 11 can be withdrawn from the key cylinder 10 only if the retaining means 16 is manually rotated counter clockwise to the LOCK position in which the key 11 is in alignment with the recess 16g and in which the steel ball 18 is captured in the rounded depression 16j in the disc member of the retaining means 16 so that the rotational action of the retaining member is controlled with a click action. The key 11 can be withdrawn from the key cylinder 10 only in this manner.

It will now be appreciated from the foregoing description that the key is removed from the key cylinder in two consecutive steps which are not related to each other through provision of a retaining means having a recess and an associated land. Necessity of such two mutually independent steps in removing the key from the key cylinder to lock the steering column will contribute to prevention of accidental or erroneous locking of the steering column during cruising of the motor vehicle. The steering lock device according to the invention thus provides reliable locking operation of the steering column.

What is claimed is:

1. A combination ignition control and steering lock device comprising a rotatable key cylinder which is rotated by an ignition key inserted thereinto, said key cylinder being operatively connected to an ignition switch, a generally cylindrical housing accommodating said key cylinder rotatable therein, a frame structure in which said housing is securely encased, a locking means for locking a steering column when said key is withdrawn from said key cylinder, and a retaining means rotatably mounted on a front end portion of said frame structure and retaining said key inserted into and rotated with said key cylinder, said retaining means being rotated together with said key when the key is rotated to accordingly rotate said key cylinder to an operating position in which said ignition switch is moved to turn on the ignition or to energize an engine starting motor and being left in situ when said key is rotated in a reverse direction to accordingly rotated said key cylinder from said position, said retaining means being manually rotated in the reverse direction to a position in which said key can be released from the retaining means and withdrawn from said key cylinder when said key and accordingly said key cylinder is in a lock position to lock said steering column.

2. A combination ignition control and steering lock device according to claim 1, in which said retaining means has formed therein a recess for slidably receiving a top edge of said key and a land angularly spaced apart from said recess for engaging with said key when the key is moved to rotate said key cylinder to said operating position, said land being left in situ when said key is rotated in the reverse to rotate said key cylinder from said position.

3. A combination ignition control and steering lock device according to claim 2, in which said retaining means includes an outer annular member rotatably mounted on the front end portion of said frame structure, an inner disc member which is substantially concentric with said annular member and connecting members securely connecting said disc member to said annular member, said disc member having formed therein an opening to admit passage of said key and an annular sunk portion formed on a rear face of the disc member to surround said opening, said recess being formed radially in said annular sunk portion and forming part of said opening and said land being mounted radially on said annular sunk portion, said angular spacing between said recess and land being selected to permit said key to rotate between said lock position and a position intermediate the lock position and said operating position.

4. A combination ignition control and steering lock device according to claim 2, in which said key has formed in its top edge an engaging portion for circumferentially slidably receiving said top edge of the key when the key is rotated from said lock position.

5. A combination ignition control and steering lock device according to claim 3, in which at least one spring-loaded steel ball is positioned between said disc member and said key cylinder, said ball being biased toward said rotating member and captured in a rounded depression formed in said retaining member when said key cylinder is rotated with said retaining means to said operating position in which said starting motor is energized.

6. A combination ignition control and steering lock device according to claim 5, in which said rounded depression is formed in the rear wall of said retaining member and spring-loaded steel ball being captured in said rounded depression when said retaining member is manually rotated to a position in which said key can be released from said retaining member.

7. A combination ignition control and steering lock device according to claim 3, in which said frame structure includes front extensions extending from a front end of the frame structure for engagement with said connecting members to limit rotation of said retaining means to a position corresponding to said operating position.

8. A combination ignition control and steering lock device according to claim 1, further comprising a cap member securely mounted on said frame structure to provide visual indication of the positions of the device.

* * * * *